Jan. 29, 1952  G. W. BERRY  2,583,723
MILK RECEIVING AND DISCHARGING UNIT
Filed May 5, 1950  2 SHEETS—SHEET 1

Inventor
Geo W. Berry
By
ATTORNEYS

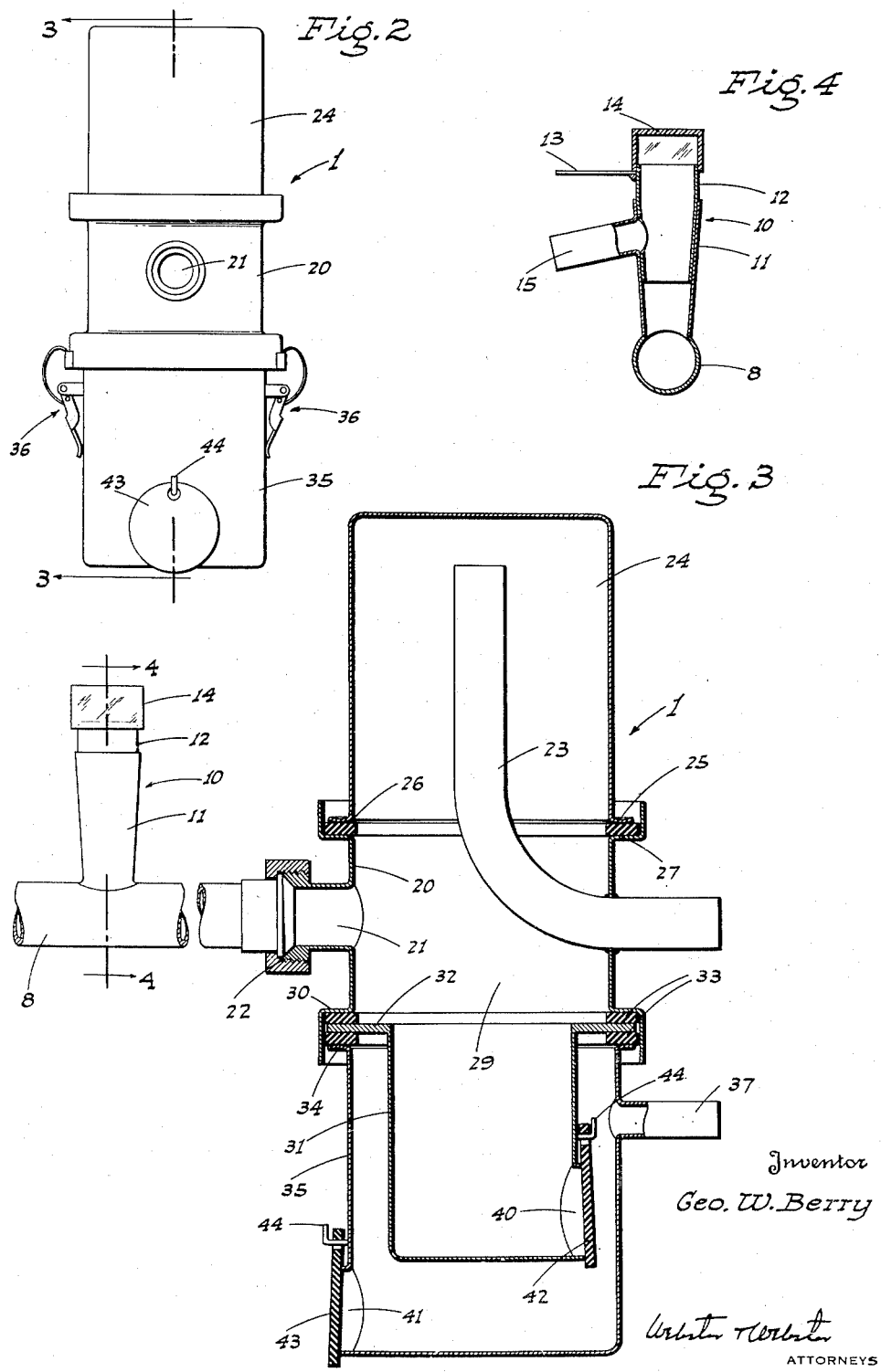

Patented Jan. 29, 1952

2,583,723

UNITED STATES PATENT OFFICE 2,583,723

MILK RECEIVING AND DISCHARGING UNIT

George W. Berry, Modesto, Calif., assignor to Berry Milking System, Modesto, Calif., a partnership Application May 5, 1950, Serial No. 160,183

1 Claim. (Cl. 119—14.07)

This invention is directed to, and it is an object to provide, a milk receiving and discharging unit, of novel construction and function, adapted for use in a milking system which includes a milk flow conduit into which the automatic milking machines deliver; the function of the unit being to receive the milk in a substantially continuous flow from said conduit and discharge the milk into a reservoir without interrupting such flow or breaking the flow inducing vacuum in the conduit.

A further object of the invention is to provide a milk receiving and discharging unit, for the purpose described, which includes a novel assembly of milk receivers with a primary one thereof disposed to receive the milk from the milk flow conduit under conditions of constant vacuum, and another or secondary receiver disposed to receive the milk from said one receiver; the secondary receiver being subject to vacuum pulsation, and there being valve means operative in response to such vacuum pulsation to establish communication between said receivers, and to open the secondary receiver to dump, alternately. Such alternation thus assures that atmospheric pressure cannot feed back into the primary receiver to destroy the vacuum therein.

An additional object of the invention is to provide a milk receiving and discharging unit, wherein the receivers are disposed one within the other in spaced relation and suspended from a hollow body capped by a vacuum dome; the milk flow conduit connecting to the body and the primary receiver opening into said body to receive the milk therefrom under the constant vacuum in the dome and body; the dome being included so that a vacuum pipe may project upward therein and thus be clear of the milk flow into said body.

Another object of the invention is to provide a milk receiving and discharging unit, as above, which is smooth in operation; easy to take apart for cleaning and sterilization; simple but sturdy in construction, embodying a minimum of moving parts; and being designed for ease and economy of manufacture.

Still another object of the invention is to provide a practical and reliable milk receiving and discharging unit, and one which will be exceedingly effective for the purpose for which it is designed.

These objects are accomplished by means of such structure and relative arrangement of parts as will fully appear by a perusal of the following specification and claim.

In the drawings:

Fig. 2 is an elevation of the milk receiving and discharging unit, detached.

Fig. 3 is an enlarged sectional elevation on line 3—3 of Fig. 2.

Fig. 4 is an enlarged sectional elevation of one of the plug valves.

Figure 1:
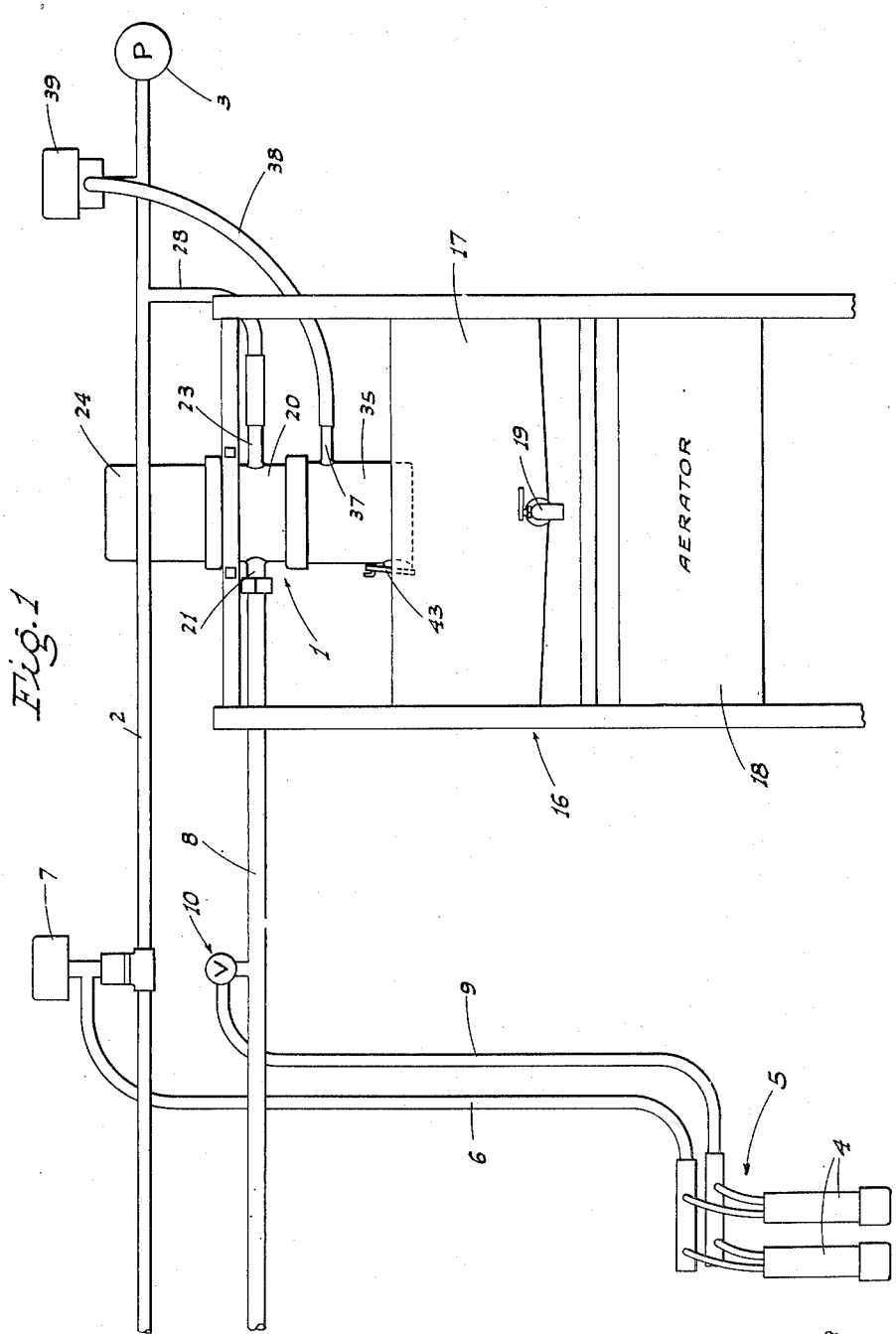
Fig. 1 is a diagrammatic elevation of a milking system embodying the novel milk receiving and discharging unit.

Referring now more particularly to the characters of reference on the drawings, the novel milk receiving and discharging unit is indicated generally at 1, and is adapted for connection with a milking system which includes a vacuum conduit 2 connected to a vacuum pump 3. The claw units 4 of automatic milking pails, including the usual teat cups 5, are connected by a vacuum hose 6 to the vacuum conduit 2, with a conventional pulsator 7 interposed therebetween.

Additionally, the milking system includes a milk flow conduit 8, and a milk hose 9 leads from each claw unit 4 to connection with said conduit 8; there being a valve, indicated generally at 10, interposed between each hose 9 and the conduit 8.

Each valve 10 is of the structure shown in detail in Fig. 4, and includes a tapered valve body 11 having a tapered turnable plug 12 therein, with the plug fitted with a handle 13. Additionally, the top portion of the plug 12 is a transparent cap 14 which permits visual inspection of milk flow through the valve. The lower end of each valve body 11 is connected to the milk flow conduit 8, and a fitting 15 projects laterally from one side of the body 11 for connection with the corresponding milk hose 9.

The milk receiving and discharging unit 1 is mounted in an open upstanding frame 16 directly above a reservoir or tank 17 secured in said frame.

Below the tank 17 the frame supports an aerator 18, and milk is adapted to be fed from tank 17 into the aerator 18 by means of a spigot 19.

The milk receiving and discharging unit 1 is of novel construction and function, as follows:

Such unit comprises a cylindrical body 20 removably secured in any suitable manner in the frame 16; such body having a lateral fitting 21 connected to the milk flow conduit 8 by a detachable coupling 22.

On the side opposite the lateral fitting 21, an inverted gooseneck conduit 23 enters the body 20 and thence projects vertically some distance thereabove axially of said body.

The upwardly projecting portion of the gooseneck conduit 23 is enclosed within a dome 24. The dome 24, which may be termed a vacuum dome, is supported by a bottom flange 25 which rests on a cushion seal 26 in an upwardly facing annular seat 27 on the upper end of the body 20.

The gooseneck conduit 23 is connected by a detachable conduit 28 with the vacuum conduit 2, whereby a constant vacuum is created in the vacuum dome 24, and consequently within the chamber 29 of the body 20.

The body 20 is cylindrical, and at its lower end is formed with an annular seat 30; there being a primary, milk receiver 31—likewise of cylindrical configuration—depending from the lower end of said body 20. The primary receiver 31 is open, at the top, to the chamber 29, and said primary receiver is supported by an annular top flange 32 engaged between cushion seals 33 in the annular seat 30. These cushion seals are maintained in place by an annular top flange 34 on the upper end of a secondary receiver 35—likewise of cylindrical configuration—which surrounds the primary receiver 31 in spaced but concentric relation.

The secondary receiver 35 is maintained in place by releasable hook units 36 which connect between opposite sides of said secondary receiver and corresponding points on the lower end of the body 20.

The secondary receiver 35 is provided, on one side, with a lateral fitting 37 which is connected by a hose 38 to the vacuum conduit 2; there being a pulsator 39 interposed between said hose and conduit whereby vacuum pulsation is produced in the secondary receiver 35.

The primary receiver 31 and the secondary receiver 35 are formed, on the side but immediately adjacent the bottom, with ports 40 and 41. These ports 40 and 41 are adapted to be closed by outwardly opening flap valves 42 and 43, respectively. These flap valves are preferably of a resilient material, and are readily detachable by reason of the fact that they are merely suspended from hooks, as at 44.

The above described milk receiving and discharging unit functions in the following manner:

Milk from the claw units 4 passes through the corresponding valves 10 into the milk flow conduit 8; the milk flowing toward the body 20 by reason of the vacuum therein. As the milk reaches the unit 1 it discharges into the chamber 29 and falls into the primary receiver 31; there being no opportunity for the milk to gain access into the gooseneck conduit 23 by reason of the extension of said conduit upwardly into the vacuum dome 24.

The milk in the primary receiver 31 cannot escape therefrom as long as the flap valve 42 is closed under the influence of the vacuum in chamber 29 and said secondary receiver.

However, with each vacuum pulse in the secondary reveiver 35, caused by the pulsator 39, the flap valve 42 is forced open, whereupon milk spills from the primary receiver 31 into the secondary receiver 32. At this time the vacuum in said secondary receiver holds the flap valve 43 tightly closed so that atmopheric pressure cannot feed back through the device, including port 40, to break the vacuum in chamber 29.

After each vacuum pulse in the secondary receiver 35, the flap valve 43 is no longer vacuum closed and the milk from said secondary receiver 35 forces the flap valve open and spills by gravity into the tank 17.

The described milk receiving and discharging unit works automatically and smoothly to accomplish the delivery of milk from the milk flow conduit 8 to the tank 17, yet without disturbing the working vacuum in said unit 1 or interrupting continuous flow in the conduit 8.

Additionally, the device is capable of being taken apart readily by hand, for the purpose of washing and sterilizing the parts after each milking operation.

Further, the structure—by reason of its simplicity—may be manufactured with ease and economy.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A milk releaser for a milking system which includes a vacuum line, a milk line, and a pulsator connected to the vacuum line, said releaser comprising a short vertical body open top and bottom, and having lateral milk and vacuum fittings adapted for connection with the milk and vacuum lines respectively, means mounting the body in a fixed position relative to said lines, the vacuum fitting projecting upwardly in the body to a termination above the same, a dome removably seated on the body over said projecting fitting portion, a primary milk receiver depending from the body, a secondary milk receiver surrounding the primary receiver, the secondary receiver being provided with a fitting adapted for connection with said pulsator, discharge valves operatively associated with each of said receivers, and means releasably clamping the receivers as a unit on the lower end of the body.

GEORGE W. BERRY.

REFERENCES CITED

The following references are of record in the file of this patent:

UNITED STATES PATENTS

| Number | Name | Date |
| --- | --- | --- |
| 1,247,329 | Ridd | Nov. 20, 1917 |
| 1,548,827 | Daysh | Aug. 11, 1925 |
| 1,562,770 | Jamieson | Nov. 24, 1925 |
| 1,644,435 | Knapp | Oct. 4, 1927 |
| 1,745,309 | Norris | Jan. 28, 1930 |